(12) United States Patent
Coqueret et al.

(10) Patent No.: US 8,234,634 B2
(45) Date of Patent: Jul. 31, 2012

(54) CONSISTENT METHOD SYSTEM AND COMPUTER PROGRAM FOR DEVELOPING SOFTWARE ASSET BASED SOLUTIONS

(75) Inventors: Regis Coqueret, Balma (FR); Bertrand H. Portier, Keswick (CA)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 12/114,939

(22) Filed: May 5, 2008

(65) Prior Publication Data

US 2008/0288944 A1  Nov. 20, 2008

(30) Foreign Application Priority Data

May 16, 2007 (FR) .................................. 07 301047

(51) Int. Cl.
*G06F 9/45* (2006.01)
*G06F 9/44* (2006.01)
*G06F 15/00* (2006.01)
*G06F 17/00* (2006.01)
*G06Q 10/00* (2012.01)
*G06N 3/10* (2006.01)
*G06N 5/02* (2006.01)

(52) U.S. Cl. ....... 717/144; 717/105; 717/109; 705/7.36; 706/45; 706/46; 706/47

(58) Field of Classification Search .................. None
See application file for complete search history.

(56) References Cited

U.S. PATENT DOCUMENTS

| | | | | |
|---|---|---|---|---|
| 4,849,879 A | * | 7/1989 | Chinnaswamy et al. | 706/45 |
| 5,450,575 A | * | 9/1995 | Sites | 717/144 |
| 5,493,675 A | * | 2/1996 | Faiman et al. | 717/144 |
| 5,613,117 A | * | 3/1997 | Davidson et al. | 717/144 |
| 5,854,929 A | * | 12/1998 | Van Praet et al. | 717/144 |
| 6,405,173 B1 | * | 6/2002 | Honarvar et al. | 705/7.36 |
| 6,665,866 B1 | * | 12/2003 | Kwiatkowski et al. | 717/144 |

(Continued)

FOREIGN PATENT DOCUMENTS

WO   03001343 A1   1/2003

OTHER PUBLICATIONS

Carl Kingsford et al., What is a decision tree?, Sep. 2008, Nature Biotechnology vol. 26 No. 9, [Retrieved on Mar. 15, 2012]. Retrieved from the internet: <URL: http://ci.ujn.edu.cn/reading/What%20are%20decision%20trees.pdf> 3 Pages (1011-1013).*

(Continued)

*Primary Examiner* — Thuy Dao
*Assistant Examiner* — Anibal Rivera
(74) *Attorney, Agent, or Firm* — Yee & Associates, P.C.; David A. Mims, Jr.

(57) ABSTRACT

A method, computer program and system for consuming reusable software assets, said assets being described with elements and attributes, said assets containing at least one variable element (VPs) themselves containing at least one variant. The user executes a program on a computer by first choosing the asset to be consumed. A decision tree corresponding to the asset is traversed, each decision point corresponding to a variable element. The decision point is processed by asking the user inputs to modify the variants of the corresponding variable elements. The modified variable elements are stored. The dependency of the decision point is indicated by a dependency attribute in the variable element.

14 Claims, 9 Drawing Sheets

U.S. PATENT DOCUMENTS

| | | | |
|---|---|---|---|
| 6,792,595 B1* | 9/2004 | Storistenau et al. | 717/109 |
| 7,137,100 B2* | 11/2006 | Iborra et al. | 717/109 |
| 7,143,392 B2* | 11/2006 | Ii et al. | 717/105 |
| 7,321,883 B1* | 1/2008 | Freedy et al. | 706/45 |
| 7,873,946 B2* | 1/2011 | Lathrop et al. | 717/109 |
| 2003/0046282 A1 | 3/2003 | Carlson et al. | |
| 2003/0120621 A1* | 6/2003 | McDaniel et al. | 706/45 |
| 2004/0107132 A1* | 6/2004 | Honarvar et al. | 706/47 |
| 2004/0268236 A1* | 12/2004 | Chidlovskii et al. | 715/513 |
| 2005/0085937 A1 | 4/2005 | Goodwin et al. | |
| 2005/0229153 A1* | 10/2005 | Banavar et al. | 717/105 |
| 2005/0262489 A1* | 11/2005 | Streeter et al. | 717/144 |
| 2006/0165123 A1 | 7/2006 | Jerrard-Dunne et al. | |
| 2006/0168558 A1* | 7/2006 | de Seabra e Melo et al. | 717/105 |
| 2006/0242180 A1* | 10/2006 | Graf et al. | 707/101 |
| 2007/0022106 A1* | 1/2007 | Brandt et al. | 707/4 |
| 2009/0048995 A1* | 2/2009 | Mahajan et al. | 706/46 |

OTHER PUBLICATIONS

J. R. Quinlan et al., Induction of Decesion Trees, 1986, Kluwer Academic Publisher, [Retrieved on Mar. 15, 2012]. Retrieved from the Internet: <URL: http://www.dmi.unict.it/~apulvirenti/agd/Qui86.pdf> 26 Pages (82-106).*

William E. Marsh, PhD et al., Decision tree analysis:Drawing some of the uncertaintly out of decision making, Jul. 1993, Swine Health and Production—vol. 1, No. 4 [Retrieved on Mar. 15, 2012]. Retrieved from the internet: <URL: http://www.aasv.org/shap/issues/v1n4/v1n4p17.pdf> 7 Pages (1-7).*

"Reusable Asset Specification OMG Available Specification Version 2.2" Object Management Group, Nov. 2005, pp. 1-121, retrieved Aug. 21, 2008 http:www.omg.org/technology/documents/formal/ras.htm.

Ran et al., "Design Decision Trees", IEEE 1996, Proceedings of the 8th International Workshop on Software Specification and Design, pp. 172-175.

* cited by examiner

```xml
<asset>
 <classification>
  <context name="Generic Asset Consumption " id="ctxt1">
    <description value="Default root decision point for all assets being consumed."/>
  </context>
  <context name="Service Construction variants" id="ctxt2">
    <description value="Shipped with asset"/>
   <descriptorGroup name=" Service Construction variant details">
      <nodeDescriptor href="https://com.ibm.../.../classif/vp_types.xmi#EAR"/>
      <nodeDescriptor href="https://com.ibm.../.../classif/variant_logic.xmi#exclusive"/>
   </descriptorGroup>
  </context>
  <context name="External Order Creation implementation variants" id="ctxt3">
   <descriptorGroup name="External Order Creation variant details">
      <nodeDescriptor href="https://com.ibm.../.../classif/vp_types.xmi#JAR"/>
      <nodeDescriptor href="https://com.ibm.../.../classif/variant_logic.xmi#exclusive"/>
   </descriptorGroup>
  </context>
  <context name="KPI Compliance Check implementation variants" id="ctxt4">
   <descriptorGroup name="KPI Compliance Check variant details">
      <nodeDescriptor href="https://com.ibm.../.../classif/vp_types.xmi#Java"/>
      <nodeDescriptor href="https://com.ibm.../.../classif/variant_logic.xmi#exclusive"/>
   </descriptorGroup>
  </context>
 </classification>
 ...
```

Fig. 5A

```
...
  <solution>
    <artifact name="Telco Service Configuration and Activation component">
      <variabilityPoint id="root" name="Asset Consumption" description="Are you sure you want to include this asset within your target solution?" reference="" context-id="ctxt1"/>
      <artifact name="Service Order Management System">
        <artifact name="Service Construction">
          <variabilityPoint id="vp1" name="Service Construction implementation" reference="root" context-id="ctxt2"/>
          <artifact>
            <reference value="ServiceConstructionEAR.ear"/>
          </artifact>
        </artifact>
        <artifact name="Service Construction implementation option 1">
          <artifact-context context-id="ctxt2">
          <reference value="ServiceConstructionEAR1.ear"/>
        </artifact>
        <artifact name="Service Construction implementation option 2">
          <artifact-context context-id="ctxt2">
          <reference value="ServiceConstructionEAR2.ear"/>
        </artifact>
        <artifact name="Service Construction implementation option 3">
          <artifact-context context-id="ctxt2">
          <reference value="ServiceConstructionEAR3.ear"/>
        </artifact>
      </artifact>
...
```

Fig. 5B

```xml
...
    <artifact name="Service Design System">
      <artifact>
        <artifact>
          <reference value="ServiceDesignSystemEAR.ear"/>
          <variabilityPoint id="vp2" name="External Order Creation implementation" reference="vp1" context-id="ctxt3">
            <artifact>
              <reference value="ExternalOrderCreation.jar "/>
            </artifact>
          </artifact>
          <artifact name="External Order Creation implementation option 1">
            <artifact-context context-id="ctxt3">
            <reference value="ExternalOrderCreation1.jar"/>
          </artifact>
          <artifact name="External Order Creation implementation option 2"> ... [ details omitted here ] ... </artifact>
        </artifact>
      </artifact>
      <artifact name="Service Activation Management System">
        <artifact name="KPI Compliance Check">
          <variabilityPoint id="vp3" name="KPI Compliance Check implementation" reference="root" context-id="ctxt4"/>
          <artifact>
            <reference value="com.ibm.eis.refimpl.telco.smof.KPIComplianceCheck.java"/>
          </artifact>
        </artifact>
        <artifact name=" KPI Compliance Check option 1"> ... [ details omitted here ] ... </artifact>
        <artifact name=" KPI Compliance Check option 2"> ... [ details omitted here ] ... </artifact>
      </artifact>
    </artifact>
  </solution>
</asset>
```

CONSISTENT METHOD SYSTEM AND COMPUTER PROGRAM FOR DEVELOPING SOFTWARE ASSET BASED SOLUTIONS

FIELD OF THE INVENTION

The present invention generally relates to development of software solutions; more particularly, this invention applies to a method for developing software asset based solutions.

BACKGROUND OF THE INVENTION

A software asset is a set of one or more related artifacts that have been created or harvested for the purpose of applying that asset repeatedly in subsequent contexts. The asset consumer is an architect or a designer of any type of IT or business process solutions from solution business modeling, analysis (assets used are models) and design to application development (assets used are pieces of code).

The IT industry has standardized software asset packaging. The Object Management Group (OMG) (OMG is either a registered trademark or a trademark of Object Management Group, Inc. in the United States and/or other countries) Reusable Asset Specification (RAS) is a set of guidelines and recommendations about the structure, content and descriptions of reusable software assets' (see Version 2.2 of November 2005). The RAS identifies categories of software assets which have a consistent packaging. RAS supports customization of assets which is a key point for the software asset consumer. In RAS, an asset being a container of artifacts, a Variability point is a point in an artifact which is expected to be adapted by the consumer to a target solution. With the variability support of RAS it is possible, for instance, to only consume a subset of an asset.

The patent application US 2003/0046282 published on Mar. 6, 2003 discloses an asset retrieval module to selectively retrieve a subset of a software asset from the asset library based on input from the user. The object of this patent application also aims at providing a solution for facilitating the step of accessing software assets based upon the consumer decision for customization. The object of this patent application, however, is more focused on the creation and consumption of assets, rather than their access or search.

On the basis of the support for software asset packaging and access, there is a need to provide full support for the consumption of reusable software assets. RAS can be used to specify the rules for installing, customizing and using a software asset. In RAS, the Usage section of the asset contains the rules for installing, customizing and using the asset. Although the usage text describes the activities to be performed by user or tooling to use an asset, this free form text does not provide enough structured guidance.

To consume assets, the user needs also to have in mind the asset based solution he wants to implement. It is recommended in the article Design Decision Trees from Alexandre Ran and Juha Kuusela from Nokia Research Center published at the 1996 IEEE, Proceedings of IWSSD-8, to apply a hierarchical organization of design patterns into a Design Decision Tree that is a partial ordering of design decisions constraints imposed by earlier decisions. In general, a decision tree may help the user in a series of decisions to reach a final target, one leaf of the tree. A software asset consumer could get down a decision tree by applying a design pattern corresponding to a set of software assets. Once the good design path, that is the asset based solution is decided, the consumer has to perform the customization of each software asset of the target solution using a repository such as RAS.

The main drawback of this type of approach is that, because the asset provider creates asset repositories on one side and separate documentation usually in text files (containing edited text, HTML, XML, SGML etc. . . . ), the asset consumer building a software asset based solution relies on two separate sources of information, i.e. the asset(s) to consume and the decision trees to guide this consumption, which leads to a two-step approach: browsing of the decision tree and deciding which path to take i.e. choosing the path which leads to target, and secondly, he has to follow this path to customize the asset. There is a need for providing software asset consumers with a method for building a target software solution avoiding a two-step (path decision, software asset customization) process.

SUMMARY OF THE INVENTION

It is an object of the present invention to provide the consumer of reusable software assets with a method for designing his asset based solution while simultaneously customizing the reused software assets.

This object is reached, according to claim 1, with a method executed on a computer for consuming reusable software assets, each asset being customizable according to a decision tree, said assets being described using a structural language comprising elements and attributes, some elements being variable elements (variability points) each variable element containing at least one variant element (variant), said method comprising:

the user indicating to the computer that he wants to consume one selected asset;

the computer traversing a decision tree wherein each decision point is codified as a variable element of the selected asset, by reading the description of the selected asset and, processing each decision point of the decision tree by:

providing the user with the variable element associated with the decision point including the at least one variant element for the variable element;

collecting from the user a modification of the variable element;

modifying the variable element accordingly;

storing the modified asset description.

The object of the invention is also reached by the method for consuming reusable software assets according to any one of claims 2 to 12. The object of the invention is also reached, according to claim 13, by a computer program product comprising programming code instructions for executing the steps of the method according to any one of claims 1 to 12 when said program is executed on a computer. The object of the invention is also reached, according to claim 14, by a system comprising means adapted for carrying out the method according to any one of claims 1 to 12.

With the method of the invention, the software asset consumer is guided with an underlying decision tree implementing the hierarchical relations between the decisions to make to consume an asset. The decision tree is embedded in the asset and is codified by mapping each decision point to a variability point in the asset. The decision tree branches (linkage from one decision point to the following decision points) are represented by variability point dependencies. The method allows building a software asset based solution in one step.

An advantage of the solution is that, contrary to traditional trees, it is possible to enter the decision tree at a location other than the root or to exit the decision tree at a non-leaf node. It is possible with the method of the invention to stop before reaching a leaf-level while recording the decisions. This supports highly flexible tools.

Other advantages of the solution can be listed as follows:

With the solution of the invention, the prescriptive guidance to consume an asset and the asset itself are co-shipped by design, which allows for the following:

The prescriptive guidance is consistently driven by the structure of the asset, with no room for discrepancies or mismatch: The asset and the guidance are synchronized.

The asset provider no longer has to provide the asset to a repository on one side, and asset guidance (e.g., text files) to another repository on another side, but rather an all-in-one material (asset+guidance) to the guided asset database).

The variability point definitions (including variability point dependencies) reflect the layout of the decision tree needed to guide the consumer through asset consumption.

Guidance is consistently role-enabled for all disciplines, which supports an end-end engagement model with collaboration (including proper hand over), which allows for the following:

This enables the storage of partially filled parameters sets along with the asset, reflecting the decisions made at the time being.

An asset consumer can stop when he/she has made decisions relevant to his/her role and associated skills in the process of consuming a customizable asset. He/she can then hand over the resulting asset to the next consumer in the team that is in charge of making subsequent decisions. This process allows different roles to collaborate on resolving variability points in the original asset. For example, a business analyst makes all of the decisions relevant to business processes, and then he/she passes the modified asset over to the software architect who can make the architectural decisions, and so forth.

The decisions made at any level are also automatically recorded, with no need for a record of them on the side.

Guidance is consistently tool-enabled for all disciplines:

Because each variability point definition is formally captured in a standard format (RAS in our implementation), the presentation of the variants to the user, and the process of making decisions can be enabled by a tool, irrespective of whether the current decision is dealing with requirements, architecture, business modeling, design, or code.

Using the same standard (RAS in the preferred embodiment) to capture asset content and prescriptive guidance can lead to significant economy of scale for a software vendor: a single tooling framework can support practitioners on guidance and asset consumption. This enables asset consumption from a generic tooling (as opposed to the development of a dedicated tooling for each asset type).

The invention yields multiple paths within the parameters, only constrained by dependencies (in general, dependencies generate a forest, not a tree). The tree of the invention is dynamic and modified by each consumer pass of the consuming method and according to the consumer's professional objectives.

The invention can be implemented using the Reusable Asset Specification v2.2 (RAS). It is important to note that the invention is independent of a specific standard or specification (such as RAS), but that it can be implemented with RAS. Also, it implies that it can then be leveraged by any tool or framework that supports (understands) RAS, including IBM Rational Software Architect (RSA), RSA being a model-driven development and static analysis tool for software architects and model-driven developers who are creating component based (SOA, J2EE and portal) applications.

BRIEF DESCRIPTION OF THE DRAWINGS

FIG. 5 (5A, 5B, 5C) is a RAS representation of one example of 'guided asset' according to the preferred embodiment of the invention;

DETAILED DESCRIPTION OF THE PREFERRED EMBODIMENT

In the preferred embodiment the invention is implemented with RAS v2.2.

Figure 1:
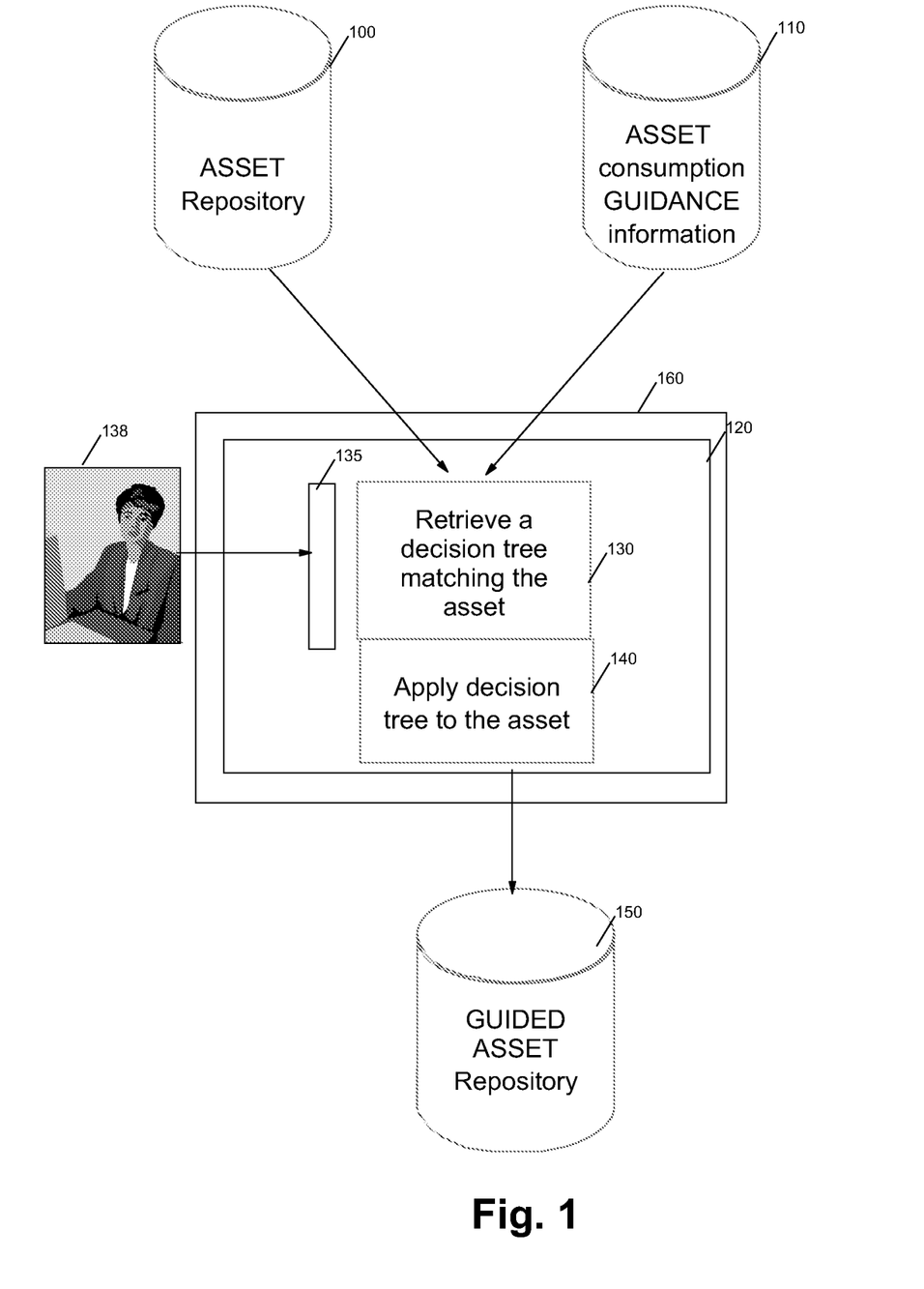
FIG. 1 describes the logical blocks for creating a database of 'guided assets' according to the preferred embodiment of the invention.

FIG. 1 describes the logical blocks for creating a database of 'guided assets' according to the preferred embodiment of the invention. In order to allow a user to develop asset based solutions, a database containing guided reusable software assets has to be created. In general the asset databases are preferably relational databases, so called asset repositories, providing an easy access to data. In the rest of the document database or repository are used indifferently. In the repositories, the assets are described as objects with a structural language such as RAS which comprises elements qualified with attributes and links to the files artifacts themselves (which are models, codes). FIG. 1 describes the principal steps for creating a guided asset which includes a modified description of the asset in the repository. The description of a 'guided asset' contains information on how to consume the asset, this information will provide a step by step guidance to the asset consumer.

In the preferred embodiment, the method for creating the 'guided asset' database is an initial operation (130, 140) in the software application (120) for consuming the assets executed on a computer (160). This operation (130, 140) can be performed by the asset provider himself or by a company developing solutions and providing guided software assets to their IT professionals. The assets themselves (models, code) are located in an asset repository (100), and used as input. The flowchart of the creation of the 'guided assets' is described later in the document in relation with the description of FIG. 3. Globally, for each asset read from the asset repository, a decision tree is retrieved (130) from the asset consumption information (110), and then codified and embedded (140) in the asset. The resulting 'guided asset' is stored in a 'guided asset' repository (150).

In the preferred embodiment, the asset consumption information is stored in the 'Asset consumption guidance information' database as text files (containing edited text, HTML, XML, SGML etc. ... ). These text files do not allow for an automatic extraction of the decision tree from the data by automatic execution of a program. This is why the creation of decision tree (130) is usually performed by a qualified operator (138) through a user interface, preferably a graphical user interface (135). If the software asset consumption guidance information is stored in a standardized way, this human intervention is no longer necessary. It is noted that in the future, the asset provider will no longer maintain asset repositories and asset information databases, but rather will just deal directly with one provided 'guided asset' repository.

It is noted also that all the cited programs (130 and 135 and 140) leading to the creation of a 'guided asset database' may be executed on different computers.

Figure 2:
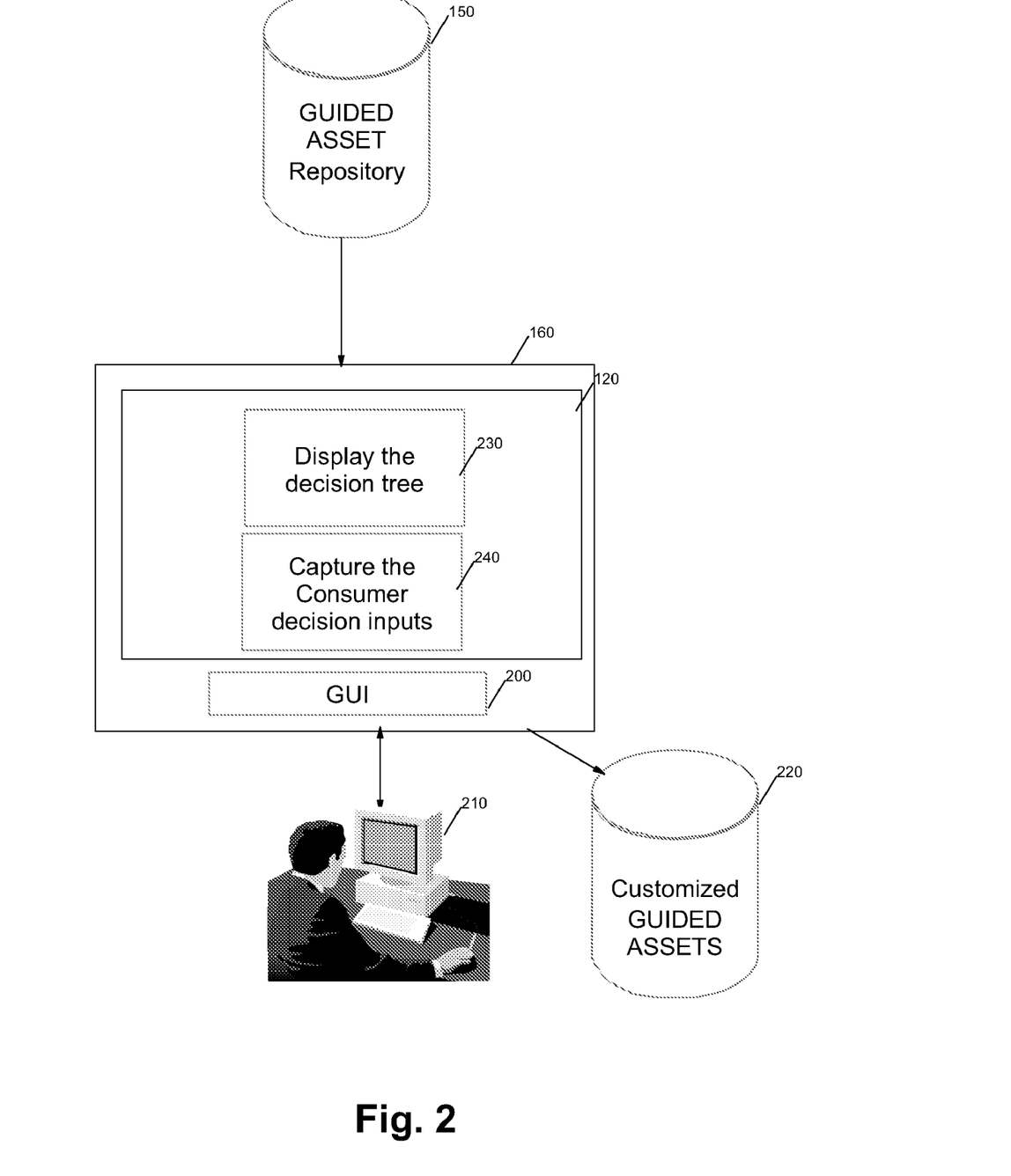
FIG. 2 describes the logical blocks for consuming the 'guided assets' according to the preferred embodiment of the invention.

FIG. 2 describes the logical blocks for consuming the 'guided assets' according to the preferred embodiment of the invention. Once the guided asset repository is built, in order to create an asset-based solution, an IT Professional (the asset consumer) will customize the software assets in a guided way by executing a part (230, 240) of the program for consuming assets (120), which can be executed on the same computer (160) or a different computer. The asset consumer will access the guided asset database (150) preferably through a graphical user interface (200) to create a customized guided asset (220). The program will display (230) to the user and for each asset, a decision tree. The program will then capture (240) the inputs of the user at each decision point of the decision tree and will customize the guided assets accordingly. It is noted that, when an asset is consumed the buildup of the final solution (updated model or code for further usage) is done as well known by a person skilled in the art, this step of finalizing of the solution being out of the scope of the present invention.

Figure 3:
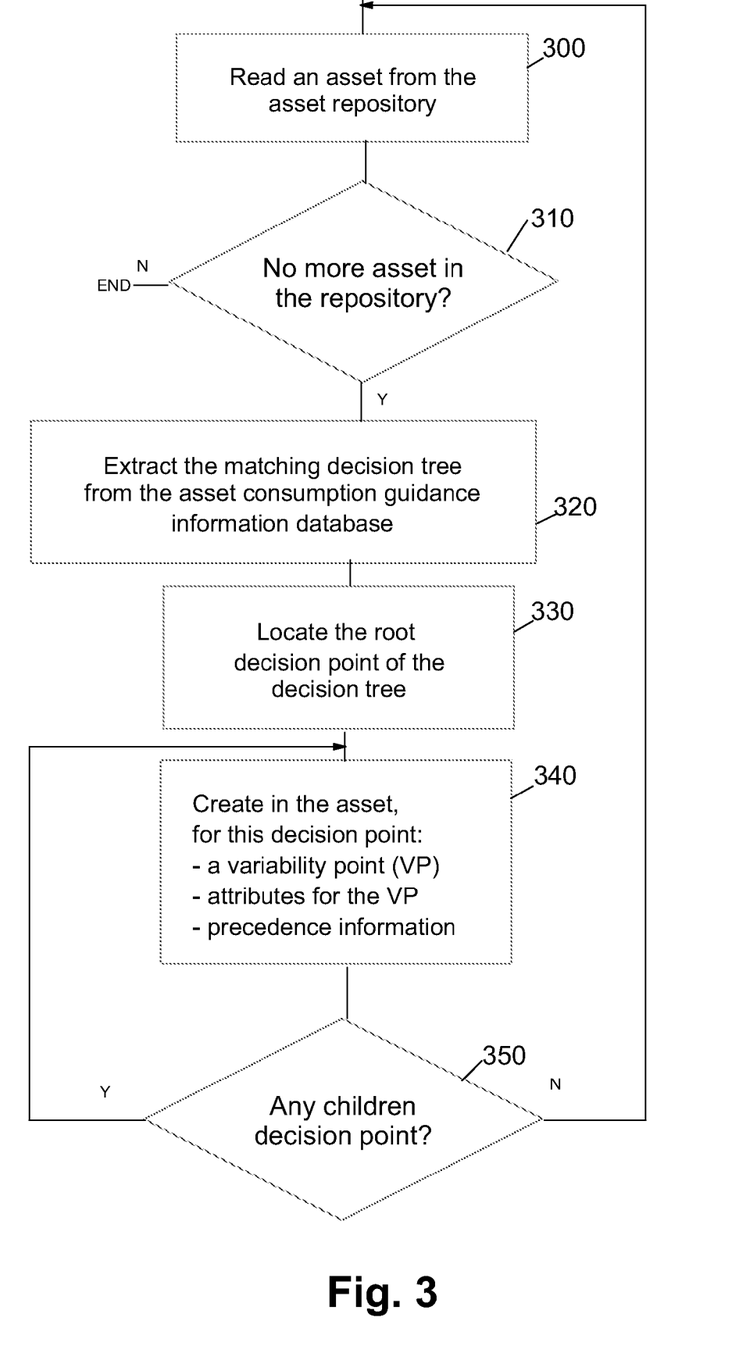
FIG. 3 is the flowchart of the method to create the 'guided assets' according to the preferred embodiment of the invention.

FIG. 3 is the flowchart of the method to create the 'guided assets' according to the preferred embodiment of the invention. The program for creating guided asset (130, 140) is executed on a computer (160) before the asset can be consumed by execution of the program for consuming assets (230, 240) on the same computer (160) or a different computer.

A first asset is read (300) from the asset repository database (100). In the preferred embodiment the assets are stored in the database in a standardized way, for example using RAS 2.2. If an asset is found (answer Yes to test 310) the corresponding decision tree is extracted (320) from the asset consumption guidance information database (110).

The root decision point is identified (330). It corresponds to the first possible choice to the branches of the decision tree. The next step consists in creating within the asset a variability point (VP), and setting this VP's attributes (340), by using the information available in the decision point previously identified (330), and contained in the tree previously extracted (320) from the asset consumption guidance information database (110). This information includes:

The name of the decision point: The name needs to be unique within the asset so that it uniquely identifies the variability point (decision point);

The description: This is textual information targeted at human beings (users), which describes the decision to be made at this point;

A set of variants: The decision point includes a set of at least one possible choices or alternatives (so called 'variants' in the rest of the document), which are already packaged with the asset. Also, one of these variants may be the one used by default if no changes are made by the asset consumer;

The type of variants: for a decision point, only variants of a certain type are acceptable. These variants can be substituted (e.g., model, code);

A parameter identifying a rule of cohabitation between the variants (for instance variant logic: inclusive, exclusive, optional);

The tools: In order to support automation and context, each variability (decision) point needs to list the software tools that can process it (the tools that can be used to make the decision). FIG. 5 shows detailed examples variability points;

A parameter identifying the place of the decision point in the decision tree: for instance, this could be the name of the preceding node in the tree.

The same step (340) is repeated (answer yes to test 350) until all the decision points of the tree have been explored, that is until there is no more children in the decision tree (answer N to test 350). The guided asset is then stored in the guided asset repository (150) and the next asset is read (300) from the asset repository.

It is noted that the decision tree that is extracted (320) and the information for filling the attributes of a VP (340) can be performed automatically by the program (120) for consuming assets only if these data are stored in a standard way in the asset consumption guidance information database (110). As previously noted, in relation with the description of FIG. 1, this information typically today is not standardized, and an operator (138) may perform an initial step of creating the information in a way that makes it consumable by the program (120), in the asset consumption guidance information database (110) by a program providing a user interface, preferably a graphical user interface (135). This step can be performed also simultaneously during the phase of creating the guided assets.

Figure 4:
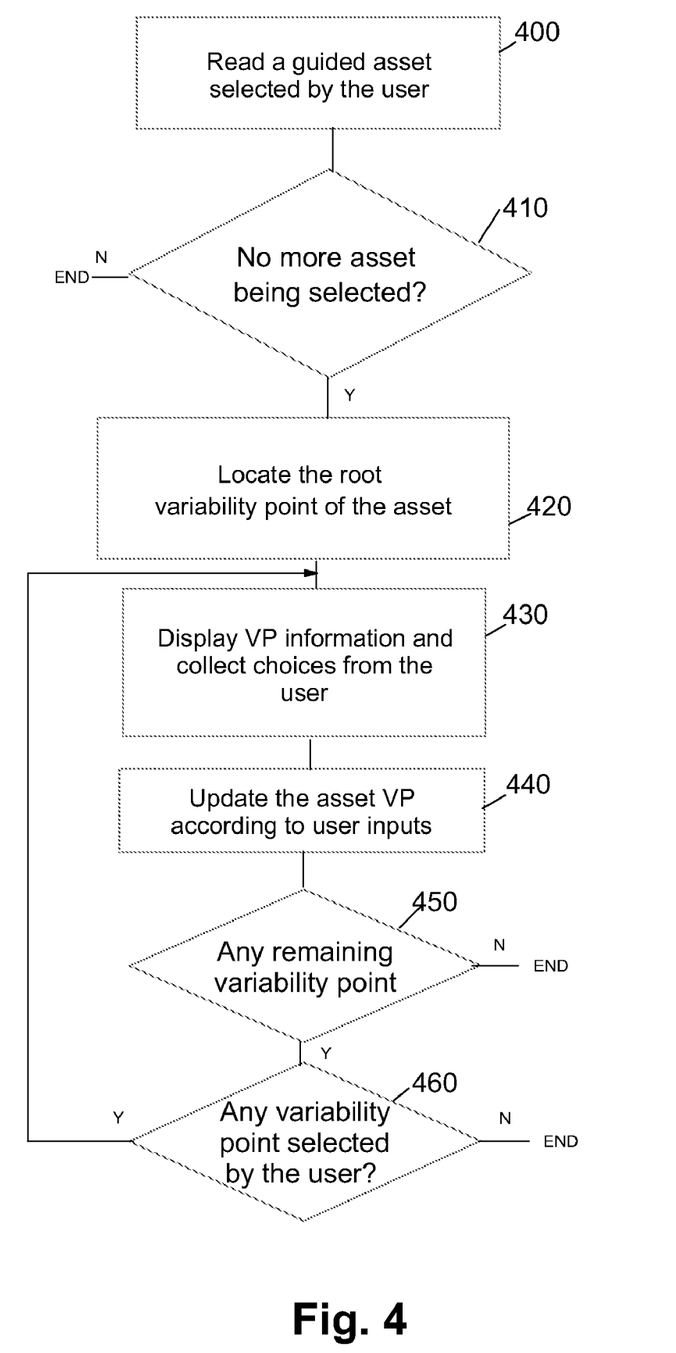
FIG. 4 is the flowchart of the method for consuming the 'guided assets' according to the preferred embodiment of the invention.

FIG. 4 is the flowchart for consuming the 'guided assets' according to the preferred embodiment of the invention. This part of the program (120) for consuming assets is executed on a computer (160) which can be the same or not as the computer used for the creation of the guided assets. The asset consumer (an IT professional) interacts with this part of the program preferably through a graphical user interface (generally wizards). The user knows which assets needs to be included in the asset based solution he is developing. He will be guided to customize the assets in accordance with the specifics of the solution he is developing.

The first step consists in displaying through the graphical user interface a screen from which the user can select (400) an asset. When an asset is selected (answer yes to test 410), the variability point of the root of the corresponding decision tree is located by the program (420). The VP description corresponding to the root is displayed (430) and the user provides inputs for introducing modifications in the root VP reflecting his choices of customization by modifying the content of the VP. The computer updates (440) the VP description as suggested by the user. The next decision points of the asset (answer yes to test 450), if selected by the user (answer yes to test 460) are displayed and updated (430, 440) until the decision tree is traversed, each node being visited (answer No to test 450). It is noted that the decision tree can be traversed by visiting all the decision points depending on a same decision point or by successively visiting each branch, all the options are possible, i.e. all tree traversal strategies and algorithms can be used, provided that they comply with the dependency relationships between decision points. This is a first option of customizing an asset by executing the method in one pass. One other possibility which is more detailed in reference to FIG. 7 later in the document, is to customize one asset in more than one pass. In this case the first pass can end when the user decides to stop (answer No to test 460). This means that the result of the customization is a partially consumed asset, FIG. 4 representing the first pass for consuming a guided asset.

The asset consumer is guided for entering his choices (430) for consuming the asset because:
- the decision points are successively displayed according to a tree dependency;
- at each decision point the computer displays the description of the VP and all VP variants.

In step 440, the guided asset is updated by entering the choices of the consumer. The choices of the consumer are applied to the VP mapping the decision point. This records the choice made by the consumer. The consumer can change anything in the description of the VP: suppress or add a variant according to the rules of cohabitation between variants, modify the attributes of the variants etc. . . . Following the structural language describing the asset as illustrated in reference with FIG. 5 hereunder in the document.

FIG. 5 is a RAS representation of a 'guided asset' according to the preferred embodiment of the invention with decision points fully described. Please note that these details are given for the sole purpose of illustrating how the invention works, and is not a limited definition of how it should be implemented using as a basis any structural language, here RAS v2.2. Also, in the preferred embodiment instead of proposing an extension of RAS 2.2, the same elements and attributes are used but some of them are used with a specific semantics. In this example, we consider a software asset which consists of source code implementation of a set of application components supporting Service Configuration and Activation, as defined in the telecommunications industry, for instance in eTOM (Enhanced Telecom Operations Maps standardizing business process in the telecommunications industry).

More precisely, this asset has been engineered in such a way that the Service Construction Implementation (within the Service Order Management System) is proposed with several possible alternatives, and Key Performance Indicator Compliance Check (within the Service Activation Management System) is also shipped with alternative implementations. In the telco industry, business processes are quite stable, but the implementation of their steps will vary, depending on whether in-house or external capabilities are used. In our example, if the asset provider has engineered it in such a way that, if the asset consumer chooses a specific alternative of Service Construction, then he can choose between several External Order Creation implementations (within the Service Design System).

FIG. 5 describes the RAS based simplified definition of a guided asset, for the example of asset as described above. This definition is simplified for reason of clarity. This definition is in conformance with RAS 2.2, any other syntax options to describe the asset could fit if one do not intend to follow RAS 2.2. This guided asset definition is created by execution of the method as described in FIGS. 1 and 3. RAS is a structural language to describe an object using elements (<asset>, <classification>, <VariabilityPoint> <artifact> etc. . . . ) Each element having attributes (id, description, reference etc. . . . ).

Figure 5A:
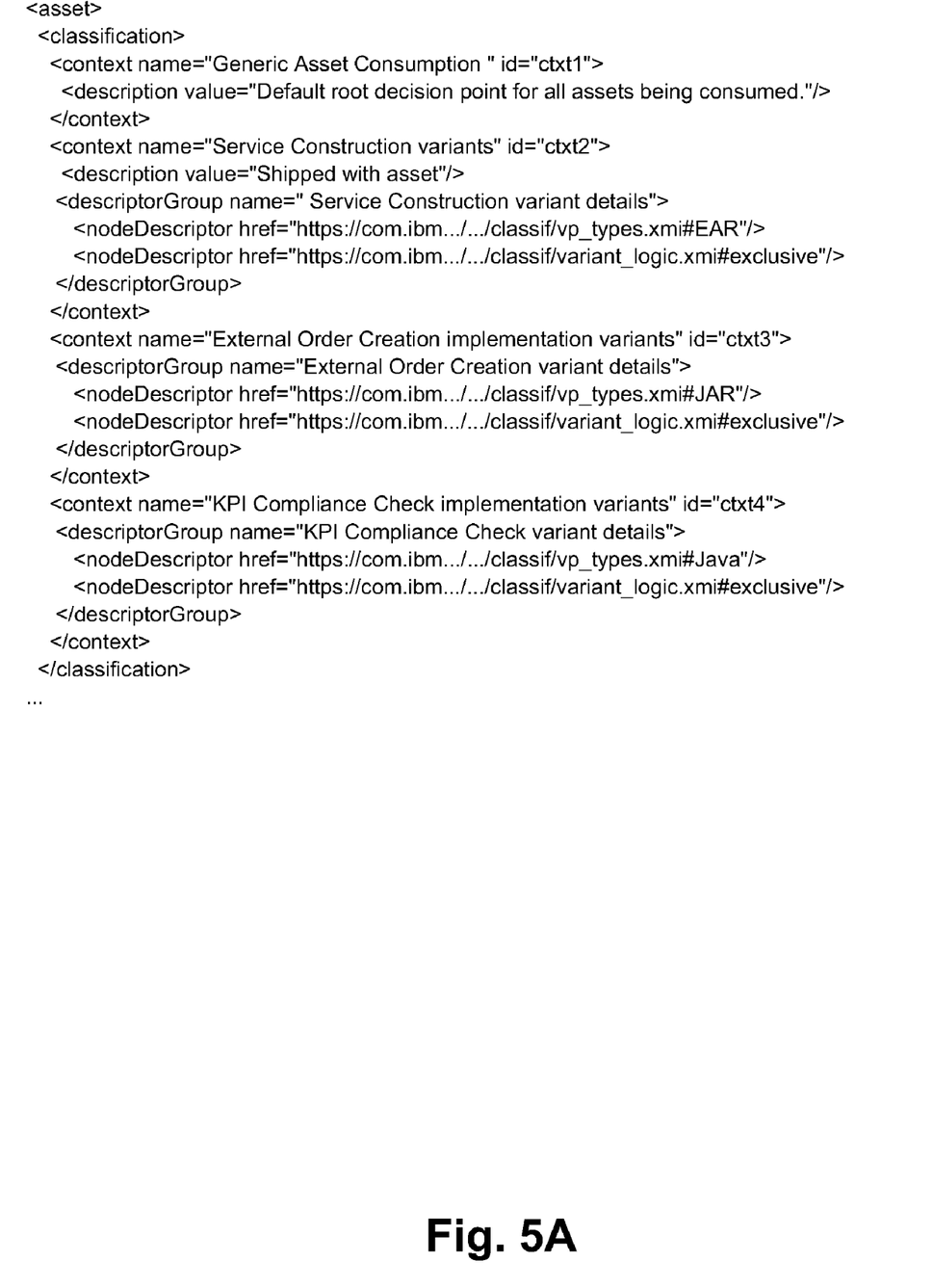
Figure 5B:
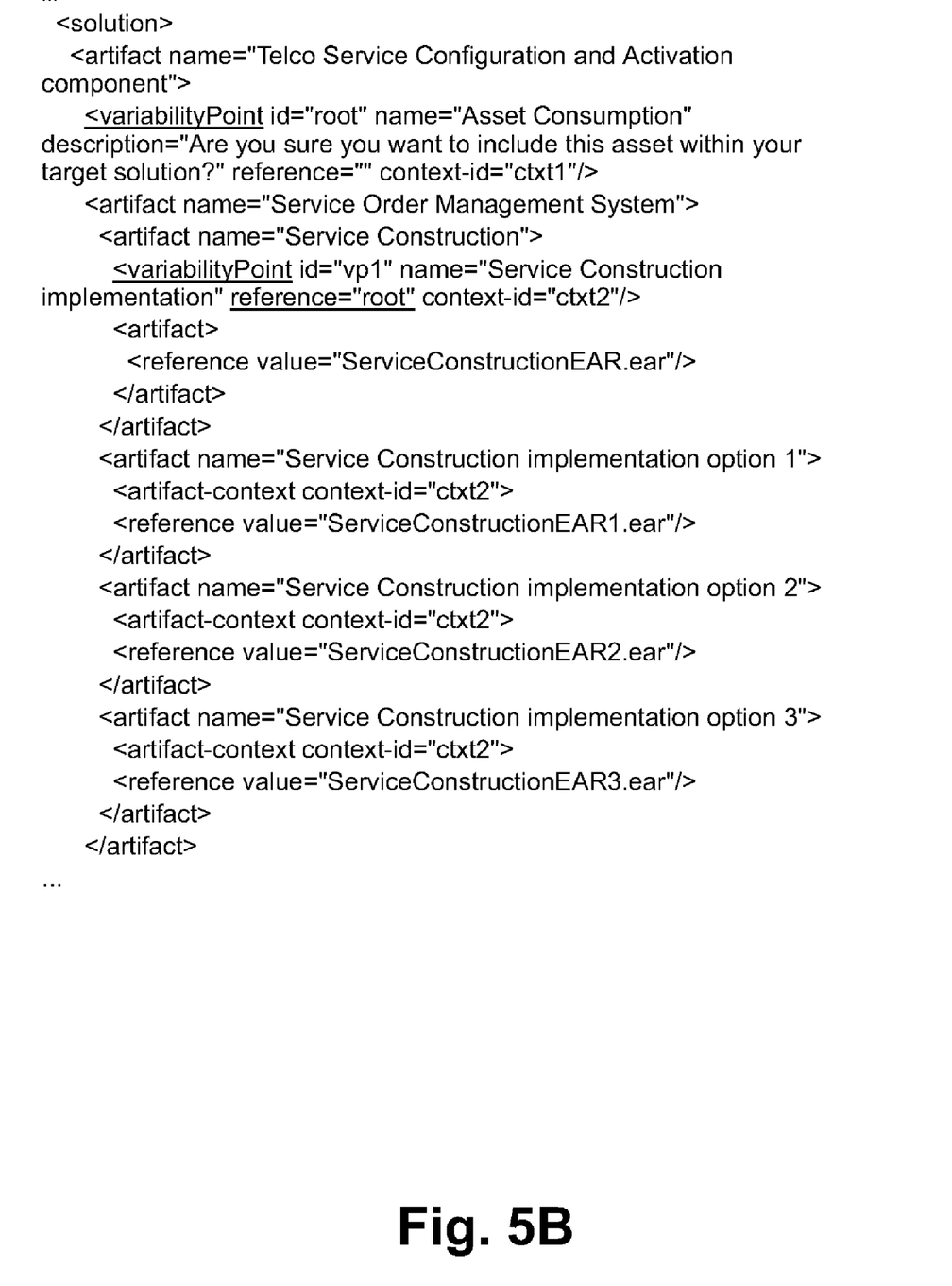
Figure 5C:
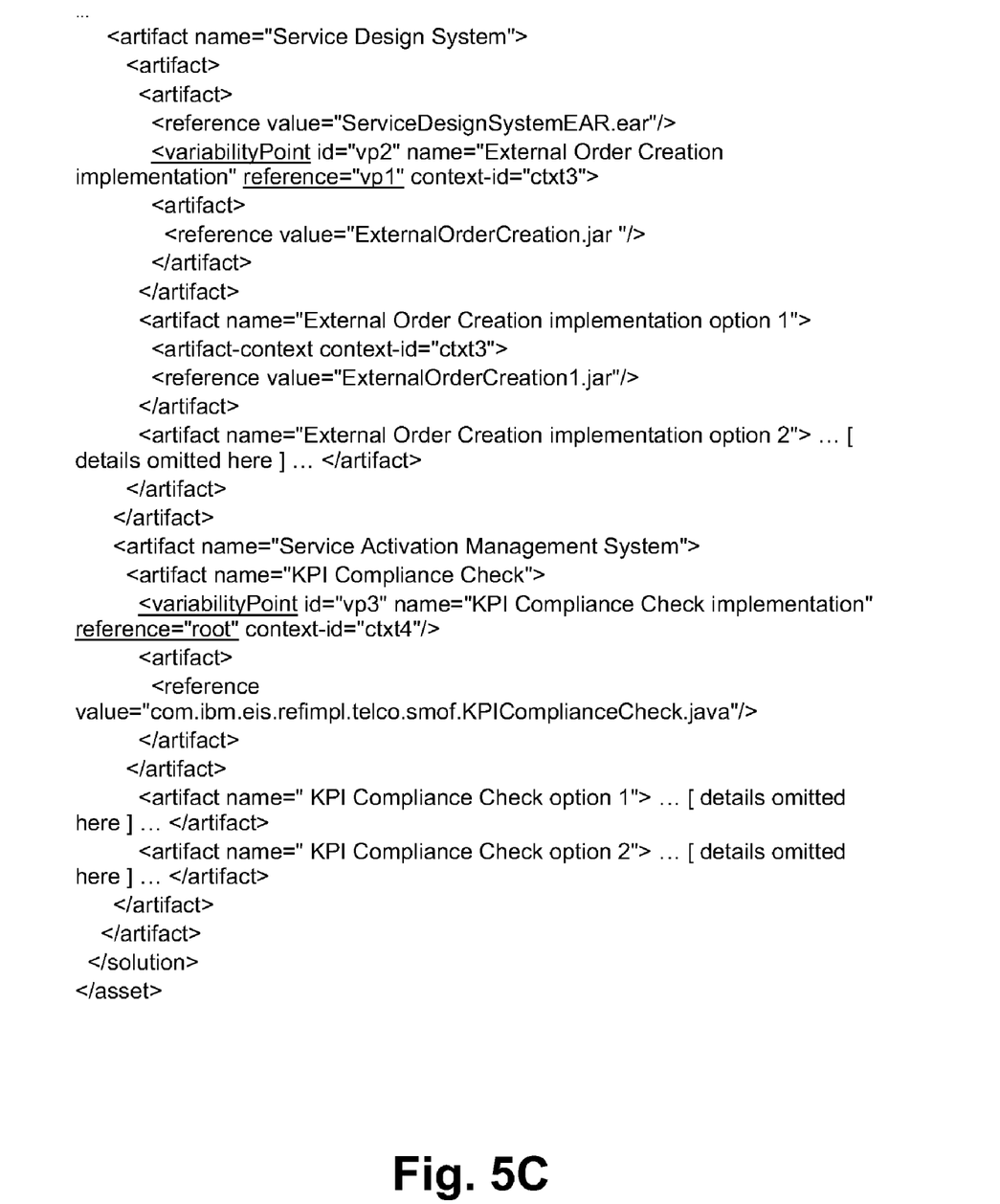
Figure 6:
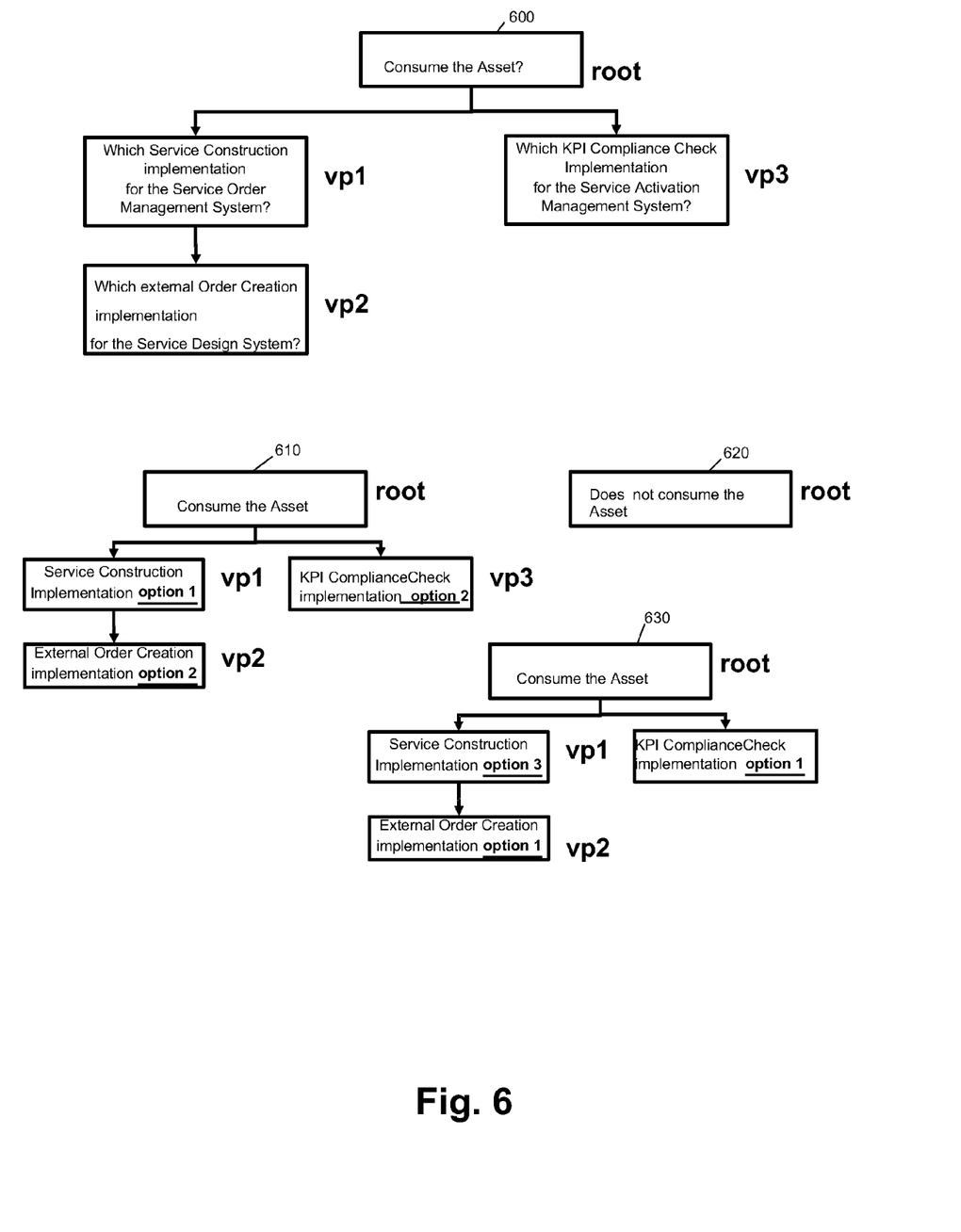
FIG. 6 is a graphical representation of the decision tree implemented in the RAS representation of the guided asset as described in FIG. 5.

The description is an XML text having the first <asset> tag in FIG. 5A and the last </asset> tag in FIG. 5C. In between the various artifact tags describe the various variability points of the asset and their variants as described earlier in the document in relation to the description of FIGS. 1 and 3. These variability points are mapped to the decision points of a corresponding decision tree of the asset as illustrated in FIG. 6. The decision points of the decision tree correspond to the different options of asset customization that the asset consumer will have to choose when executing the method as described in FIG. 2 and FIG. 4.

In FIG. 5B, two variability points are described on two artifacts, the "root" variability point (VP) for "Asset consumption" is described in the artifact "Telco Service Configuration and Activation component" and the "VP1" variability point for "Service Construction implementation" is described in the artifact "Service Construction".

In FIG. 5B, the root VP is the usual entry for customization of the asset as illustrated in FIG. 3 and there is no possible alternative for customization, no 'variant'. The attribute 'reference' describes the place of the root decision point in the decision tree (it is void because the root has no precedence). More generally this 'reference' attribute will qualify the dependency of the VP in the decision tree. The description of the VPs, the types of variants, as well as the rules guiding the cohabitation between variants, if any, are provided by the attribute 'context-id'. The value of 'context-id' for the root VP is "ctx1". For reason of compatibility with RAS 2.2 the value of the 'context-id' of all the VPs are listed in FIG. 5A under the <context> tags of the global <classification> tag. For "ctx1" the description in FIG. 5A only contains a name and description as there is no variants.

FIG. 5B shows that at the vp1 decision point, the asset consumer will have choices for customization. vp1 VP has three variants described respectively in the artifacts "Service Construction implementation option 1", "Service Construction implementation option 2" and "Service Construction implementation option 3". The attribute 'reference' for the vp1 VP is root (reference="root") because vp1 depends on the root in the decision tree. The value of 'context-id' for the vp1 VP is "ctx2". For "ctx2" the description in FIG. 5A contains the name, description, variant type and cohabitation rule ("exclusive").

In FIG. 5C, two variability points are described on two artifacts, the "vp2" variability point (VP) for "External Order Creation implementation" is described in the artifact "Service Design System" and the "VP3" variability point for "KPI Compliance Check implementation" is described in the artifact "KPI Compliance Check".

In FIG. 5C, the "vp2" VP has two variants described respectively in the artifacts "External Order Creation implementation option 1" and "External Order Creation implementation option 2". The attribute 'reference' for the vp2 VP is vp1 (reference="vp1" the parent node in the decision tree). The value of 'context-id' for the vp2 VP is "ctx3". For "ctx3" the description in FIG. 5A contains the name, description, variant type and cohabitation rule ("exclusive").

In FIG. 5C, the vp3 VP has two variants described respectively in the artifacts "KPI Compliance Check option 1" and in the artifacts "KPI Compliance Check option 2". The attribute 'reference' for the vp2 VP is vp1 (reference="root" the parent node in the decision tree). The value of 'context-id' for the vp2 VP is "ctx4". For "ctx4" the description in FIG. 5A contains the name, description, variant type and cohabitation rule ("exclusive").

As mentioned above, the variability points and their variants are linked together by pointing to the same context, and the context definition includes details like rules for combining or not variants (in our example it is exclusive), as well as the type of acceptable variants (J2EE Enterprise Archive file, Java Archive file, Java file).

The Variability Points "Service Construction implementation" and "KPI Compliance Check implementation" refer to the "Asset Consumption" variability point, which stands for the root of the decision tree. This reflects the entry point into the decision tree.

The Variability Point "External Order Creation implementation" refers to the "Service Construction implementation" variability point. This reflects the dependency, in the structure of the decision tree.

This preferred embodiment uses RAS v2.2 as it is, with one minor exception. In RAS, the reference attribute on VariabilityPoint may be used to provide further background and clarification; we have changed the semantics of the "reference" attribute on the <variability-point> XML tag, to capture the precedence relationship between variability points, reflecting the structure of the decision tree, i.e. the order in which the decision points have to be considered.

FIG. 6 is a graphical representation of the dependency tree (600) as implied by the decision tree of the guided asset illustrated by its RAS representation of FIG. 5. The decision points are root, vp1, vp2, vp3. The following dependencies are represented: vp2 has a dependency on vp1; vp1 and vp3 have a dependency on root. In the preferred embodiment, the dependencies correspond to the value of the VP's 'reference' attribute in the guided asset. For each decision point, the dependencies codify the possible branches of the decision tree.

If the consumption guidance information (110) associated with one asset contains a design model and an implementation model, there are two natural logical decision trees in the asset: the design tree, and the implementation tree. Within the guided asset, only one decision tree is built, i.e., there is one decision tree per asset. When multiple natural logical trees exist in an asset, we add one decision point (variability point) at the beginning, called root. The root variability point then simply asks the user which natural logical tree he wants to walk through (in our example whether he wants to consume the design model or the implementation model). This ensures that there is always one and only one decision tree to guide the consumption of a guided asset. The method for consuming the asset then yields multiple paths within the parameters, only constrained by dependencies.

In FIG. 6, trees 610, 620 and 630 illustrate three ways to consume the guided asset of FIG. 5. In 610 the consumer chooses option 1 of Service Construction implementation vp1 decision point which is exclusive (according to the description of "ctx2" context) to the other variants (option 2 and option 3). Then, the consumer chooses option 2 at the External Order Creation implementation vp2 decision point.

With the consumed asset of 620 no change has been brought to the guided asset because the user has decided not to consume it. In 630, the asset consumer has chosen different variants at the successive decision points of the decision tree.

Figure 7:
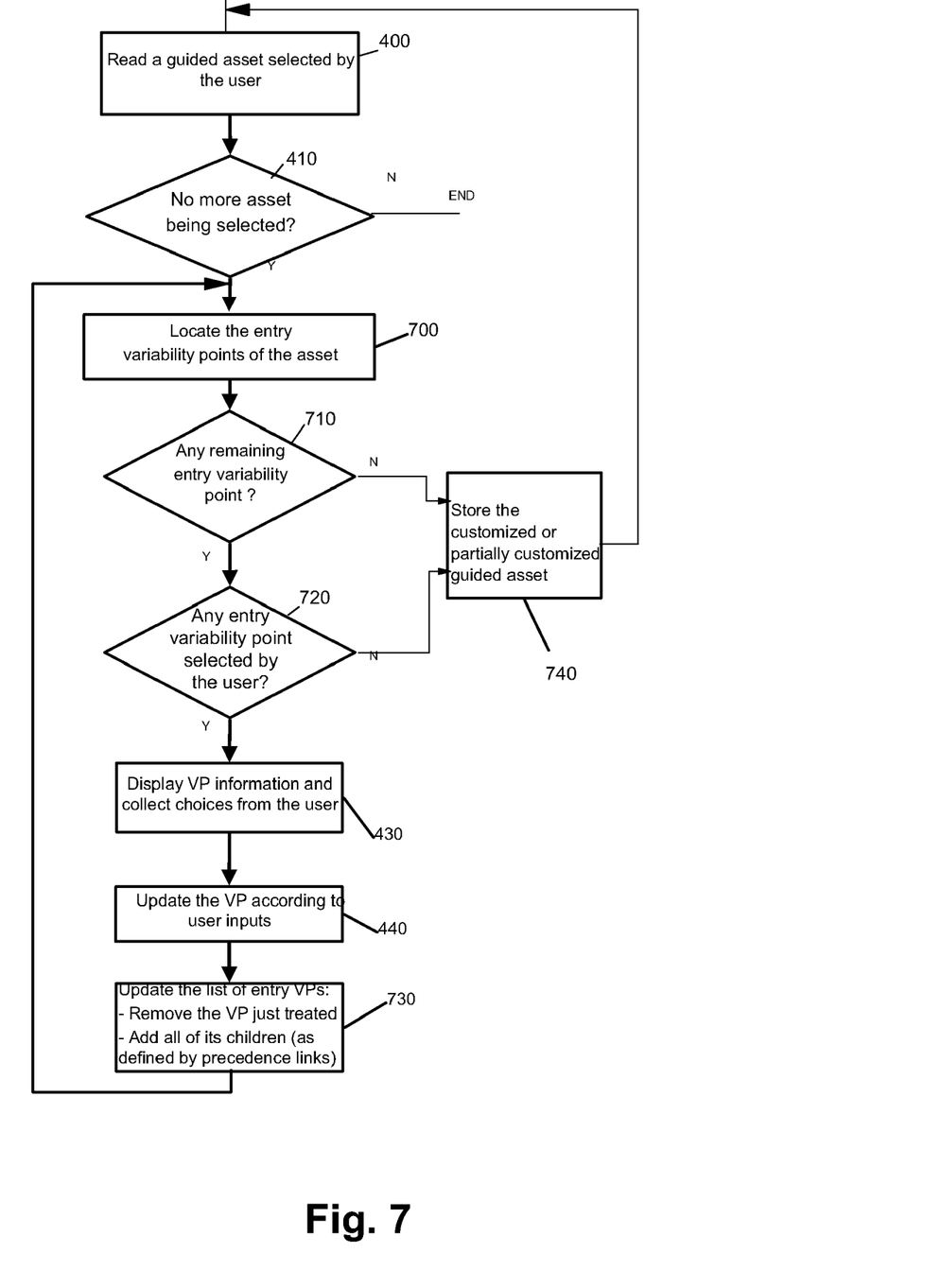
FIG. 7 is the flowchart of the method for consuming the 'guided assets' containing multiple entry points according to one other embodiment of the invention.

An extension of the method for consuming a guided asset allowing more than one pass, is described with the flowchart of FIG. 7. Assuming that a first pass for consuming the asset has been performed (FIG. 4) and that the decision tree of the guided asset has not been entirely traversed, all the decision points of the tree have not been processed (430, 440): the corresponding variability points of the decision points of the decision tree which have not been processed have not been updated (440). For the passes following the first pass, the consumer can reenter the decision tree exploration by one 'entry point' which may be either a decision point already processed (430, 440) in a previous pass or a decision point following (in the dependency tree) the last already visited decision point. The consumer is proposed in this more general flowchart of FIG. 7 to choose one entry point among all the entry points of the decision tree including the root of the decision tree which is the only entry point of the first pass flowchart of FIG. 4.

Once the computer reads a guided asset (400) that the user has selected (answer yes to test 410), the computer locates the entry variability points of the asset (700): if not all of the decision points have been processed in a previous pass (answer Yes to test 710), the consumer is asked to select one of them and if one is selected (answer Yes to test 720), the decision point is processed that is the user is asked to enter his choices (430) and the computer updates the corresponding variability point in the asset accordingly (440). A new step is added for maintaining a list of entry points by suppressing the variability point of the decision point just processed and by adding the following decision point(s) in the dependency tree of the asset, that is the children of the decision tree (730). This list is read by the computer for executing following step for locating all the entry points (700).

The program for consuming a guided asset may end because the consumer does not choose to consume an asset (answer No to test 410). If the computer does not find any entry point because there is no more remaining entry point (answer No to test 710) or if the consumer does not choose to process the remaining entry points (answer No to test 720), the process of the selected asset is completed and the computer stores (740) the asset as it has been processed that is the asset as completely (answer No to test 710) or partially consumed (answer No to test 720) by the consumer.

A variation of the process described with the flowchart of FIG. 7 is that when the consumer has consumed only one part of the guided asset (answer No to test 720) the partially consumed guided asset is stored (answer No to test 720) as a new guided asset. The reason for that depends on how the asset is consumed. A consumer may process (430, 440) the decision point by selecting a variant of the corresponding VP. However, at a decision point a consumer may enrich (430, 440) the corresponding VP for instance, by adding a new variant and adding a corresponding code by adding a <reference value=filename.jar> as seen in the guided asset description of FIG. 5B. The resulting modified guided asset may be useful for further consumers and in this case it may be advantageous to store the result of the enriched guided asset as a new 'guided asset'. The next consumer of the enriched guided asset will customize it by processing the decision points not yet processed. There may be other ways to modify a VP (430) according to the professional capacities and preferences of the consumer and depending on the structural language (RAS) used.

Decision point processing and corresponding Variability point modifications can happen at asset creation time (default values), or at asset consumption time by other consumers. For example, the architect may have already made architectural decisions on the asset when the designer gets the asset and has to make design decisions.

In general a partially consumed asset is stored (740) for further consumption by the same user, or other users performing with different roles (architect, designer, IT professional specialist for security etc. . . . ) with respect to asset consumption.

FIG. 7 illustrates the strong advantage of the solution of the invention which is that an asset consumer can stop when he/she has made decisions relevant to his/her role and associated skills in the process of consuming a customizable asset. He/she can then hand over the resulting asset to the next consumer in the team that is in charge of making subsequent decisions. As mentioned earlier in the document this method allows different professionals to collaborate on resolving variability points in the original asset such as a business analyst, a software architect, as designer and a different designer specialist of implementation of security.

It is noted that, even though there is only one tree codified in a given asset, providing multiple entry points to the user is very similar to providing multiple trees (sub-trees) guiding the consumption of the asset.

The invention claimed is:

1. A method executed on a computer for consuming reusable software assets, each asset being customizable according to a decision tree having a plurality of decision points that provide guidance to a user in navigating the decision tree, said assets being described using a structural language comprising elements and attributes, with some of the elements being variable elements, with each variable element containing at least one variant element, said method comprising:
the user indicating that he wants to consume one selected asset, wherein the decision tree is embedded in the selected asset;
the computer traversing the decision tree, wherein each decision point of the decision tree is codified as a variable element of the selected asset, by reading a description of the selected asset, and processing each decision point of the decision tree by:
providing the user with the variable element associated with the decision point including the at least one variant element of the variable element;
collecting from the user a modification of the variable element;
modifying the variable element in accordance with the modification of the variable element collected from the user; and
storing the modified variable element to form a modified asset description.

2. The method of claim 1 wherein the step of traversing the decision tree is performed in one pass.

3. The method of claim 2 further comprising:
displaying the decision tree to the user and collecting from the user an indicia indicating a decision made by the user at the decision point, wherein the steps of displaying the decision tree, the user indicating, the computer providing to the user and the computer collecting from the user are done through a graphical user interface.

4. The method of claim 1 wherein the step of traversing the decision tree is repeatedly partially performed with as many passes as necessary to traverse the entire decision tree, by reading at each partially traversing pass the modified asset description stored at a previous partially traversing pass and starting the processing of each decision point after the last processed decision point(s) during the previous pass.

5. The method of claim 4 wherein the step of traversing the decision tree further includes:
reading a root variable element having a root identification attribute;
reading all the variable elements having a root dependency attribute;
reading an identification attribute of the variable elements depending on the root variable element;
reading successively, for all the variable elements having a dependency attribute, the identification attribute of the variable elements.

6. The method of claim 4 wherein each pass of partially traversing the decision tree is stopped after processing a decision point, at the initiative of the user.

7. The method of claim 5 wherein the assets are described using, and the modified asset description is stored using, Reusable Asset Specification (RAS) as the structural language.

8. The method of claim 7 wherein the dependency attribute is a RAS reference attribute that links a given decision point of the decision tree to another decision point of the decision tree.

9. The method of claim 1 further comprising an initial step of:
creating an asset description comprising, for each decision point in the decision tree, an element with an identification attribute and a dependency attribute containing the identification attribute of another element on which the decision point depends in the decision tree.

10. The method of claim 1 wherein the step of collecting from the user a modification comprises choosing at least one variant element of the variable element, wherein the at least one variant element and the variable element are linked together using a common context that defines at least one rule for combining the at least one variant element with other variant elements as well as at least one acceptable type of variant for the at least one variant element.

11. The method of claim 1 wherein the step of collecting from the user a modification comprises collecting from the user a new variant element and an accompanying code element.

12. The method of claim 1 further comprising:
after completing the traversal of the decision tree, applying the modified asset description to the content of the asset to create a customized asset that has the decision tree embedded therein.

13. A computer program product stored in a non-transitory computer readable medium comprising programming code instructions for consuming reusable software assets, each asset being customizable according to a decision tree having a plurality of decision points that provide guidance to a user in navigating the decision tree, said assets being described using a structural language comprising elements and attributes, with some of the elements being variable elements, with each variable element containing at least one variant element, when said programming code instructions are executed on a computer, said programming code instructions comprising:
instructions for receiving from the user an indication that he wants to consume one selected asset, wherein the decision tree is embedded in the selected asset;
instructions for traversing the decision tree, wherein each decision point of the decision tree is codified as a variable element of the selected asset, by reading a description of the selected asset, and processing each decision point of the decision tree by:
instructions for providing the user with the variable element associated with the decision point including the at least one variant element of the variable element;
instructions for collecting from the user a modification of the variable element;
instructions for modifying the variable element in accordance with the modification of the variable element collected from the user; and
instructions for storing the modified variable element to form a modified asset description.

14. A computer system having a processor for consuming reusable software assets, each asset being customizable according to a decision tree having a plurality of decision points that provide guidance to a user in navigating the decision tree, said assets being described using a structural language comprising elements and attributes, with some of the elements being variable elements, with each variable element containing at least one variant element, the computer system executing program instructions in memory to perform steps comprising:

receiving from the user an indication that he wants to consume one selected asset, wherein the decision tree is embedded in the selected asset;

traversing the decision tree, wherein each decision point of the decision tree is codified as a variable element of the selected asset, by reading a description of the selected asset, and processing each decision point of the decision tree by:

providing the user with the variable element associated with the decision point including the at least one variant element of the variable element;

collecting from the user a modification of the variable element;

modifying the variable element in accordance with the modification of the variable element collected from the user; and     storing the modified variable element to form a modified asset description.

\* \* \* \* \*